United States Patent
Mitsugi et al.

(10) Patent No.: US 8,218,232 B2
(45) Date of Patent: Jul. 10, 2012

(54) OPTICAL RESONATOR WITH STRUCTURE TO IMPROVE MODE-PARTICLE INTERACTION

(75) Inventors: Satoshi Mitsugi, Kawasaki (JP); Kouichi Ichimura, Yokohama (JP); Hayato Goto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 761 days.

(21) Appl. No.: 12/233,960

(22) Filed: Sep. 19, 2008

(65) Prior Publication Data

US 2009/0153952 A1    Jun. 18, 2009

(30) Foreign Application Priority Data

Sep. 26, 2007 (JP) ................. 2007-249652

(51) Int. Cl.
*H01S 3/08* (2006.01)
*H01P 7/06* (2006.01)
(52) U.S. Cl. .............. 359/346; 333/219.1; 333/230; 372/92; 372/98
(58) Field of Classification Search .......... 333/219.1, 333/230; 372/92, 98; 359/346
See application file for complete search history.

(56) References Cited

U.S. PATENT DOCUMENTS

| | | | | |
|---|---|---|---|---|
| 6,800,837 B1 * | 10/2004 | Ichimura et al. | .......... | 250/214 R |
| 7,218,190 B2 * | 5/2007 | Engheta et al. | ............ | 333/239 |
| 7,437,533 B2 * | 10/2008 | Ichimura et al. | ............ | 712/1 |
| 7,447,719 B2 * | 11/2008 | Goto et al. | ............ | 708/191 |
| 7,466,725 B2 * | 12/2008 | Ichimura et al. | ......... | 372/2 |
| 7,492,494 B2 * | 2/2009 | Goto et al. | ............ | 359/107 |
| 2005/0110106 A1 * | 5/2005 | Goto et al. | ............ | 257/432 |
| 2006/0043357 A1 * | 3/2006 | Ichimura et al. | ............ | 257/14 |
| 2007/0085114 A1 * | 4/2007 | De Rossi et al. | ............ | 257/290 |
| 2008/0192315 A1 * | 8/2008 | Goto et al. | ............ | 359/107 |
| 2008/0231837 A1 * | 9/2008 | Ichimura et al. | ......... | 356/72 |
| 2009/0030962 A1 * | 1/2009 | Goto et al. | ............ | 708/493 |
| 2009/0084991 A1 * | 4/2009 | Ichimura et al. | ......... | 250/493.1 |
| 2009/0091812 A1 * | 4/2009 | Goto et al. | ............ | 359/107 |

FOREIGN PATENT DOCUMENTS

FR    2940522 A1 *   6/2010
JP    2001-209083     8/2001

OTHER PUBLICATIONS

G. D'Aguanno, et al. "Transmission Properties and Field Localization in a negative index Fabry-Perot Etalon", Laser Physics, vol. 15, No. 4, pp. 590-593 (2005).*

(Continued)

*Primary Examiner* — Eric Bolda
(74) *Attorney, Agent, or Firm* — Oblon, Spivak, McClelland, Maier & Neustadt, L.L.P.

(57) ABSTRACT

An optical resonator includes a master resonator configured to resonate an electromagnetic wave, one structure or a pair of structures adjacent to each other, each of which is arranged at a position that overlaps one of resonance modes of the master resonator, is made up of a material in which a real part of a permittivity assumes a negative value, and an absolute value of the real part is larger than an absolute value of an imaginary part of the permittivity, and has a size which makes scattering that the electromagnetic wave suffers be Rayleigh scattering, and one or a plurality of particles, each of which is laid out near the structure by a distance smaller than the size of the structure.

12 Claims, 9 Drawing Sheets

OTHER PUBLICATIONS

Pellizzari et al. "Decoherence, Continuous Observation, and Qauntum Computing: A Cavity QED Model", Physical Review Letters, vol. 75, No. 21, pp. 3788-3791 (Nov. 20, 1995).*

Anger et al. "Enhancement and Quenching of Single-Molecule Fluorescence", Physical Review Letters, vo. 96, pp. 113002-1-4, (Mar. 24, 2006).*

M. Ootsu, et al., "Near Field Nano Photonics Approach", First Edition, Optoronics Corporation, published Apr. 25, 2000, 4 pages.

Hiromitsu Furukawa, et al., "Local field enhancement with an apertureless near-field-microscope probe", Optics Communications, vol. 148, 1998, pp. 221-224.

Tomokatsu Hayakawa, et al., "Field enhancement effect of small Ag particles on the fluorescence from $Eu^{3+}$-doped $SiO_2$ glass", Applied Physics Letters, vol. 74, No. 11, Mar. 15, 1999, pp. 1513-1515.

* cited by examiner

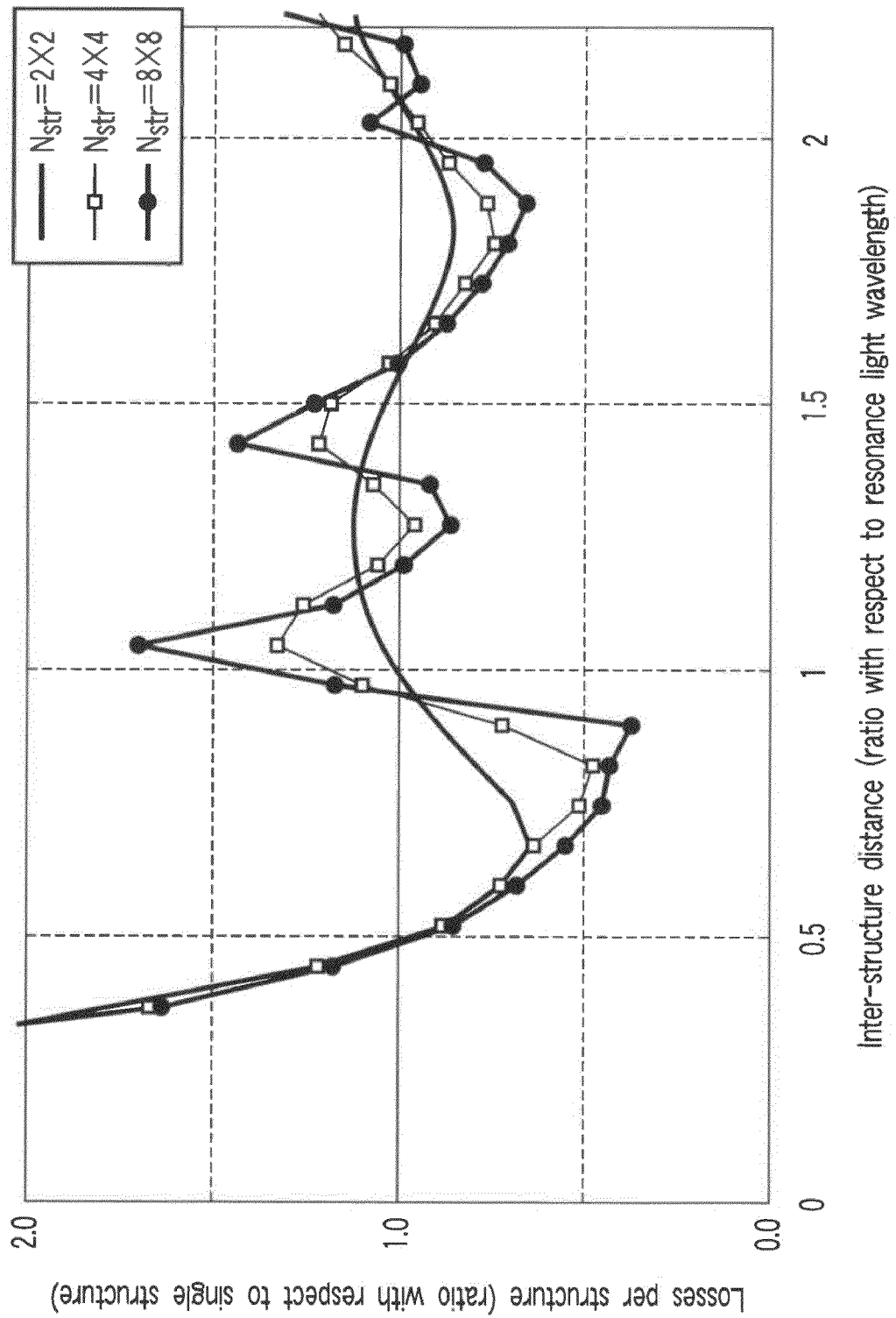
F I G. 8

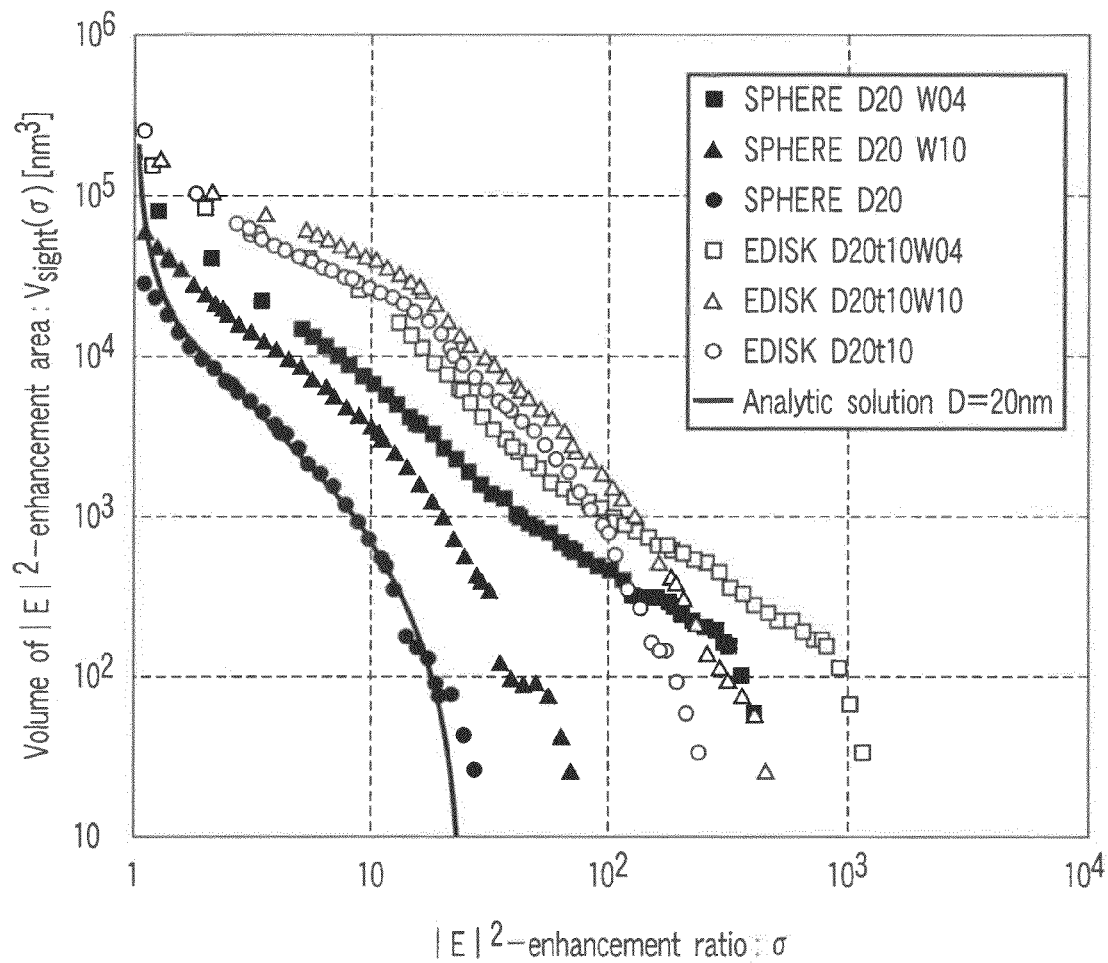
F I G. 15

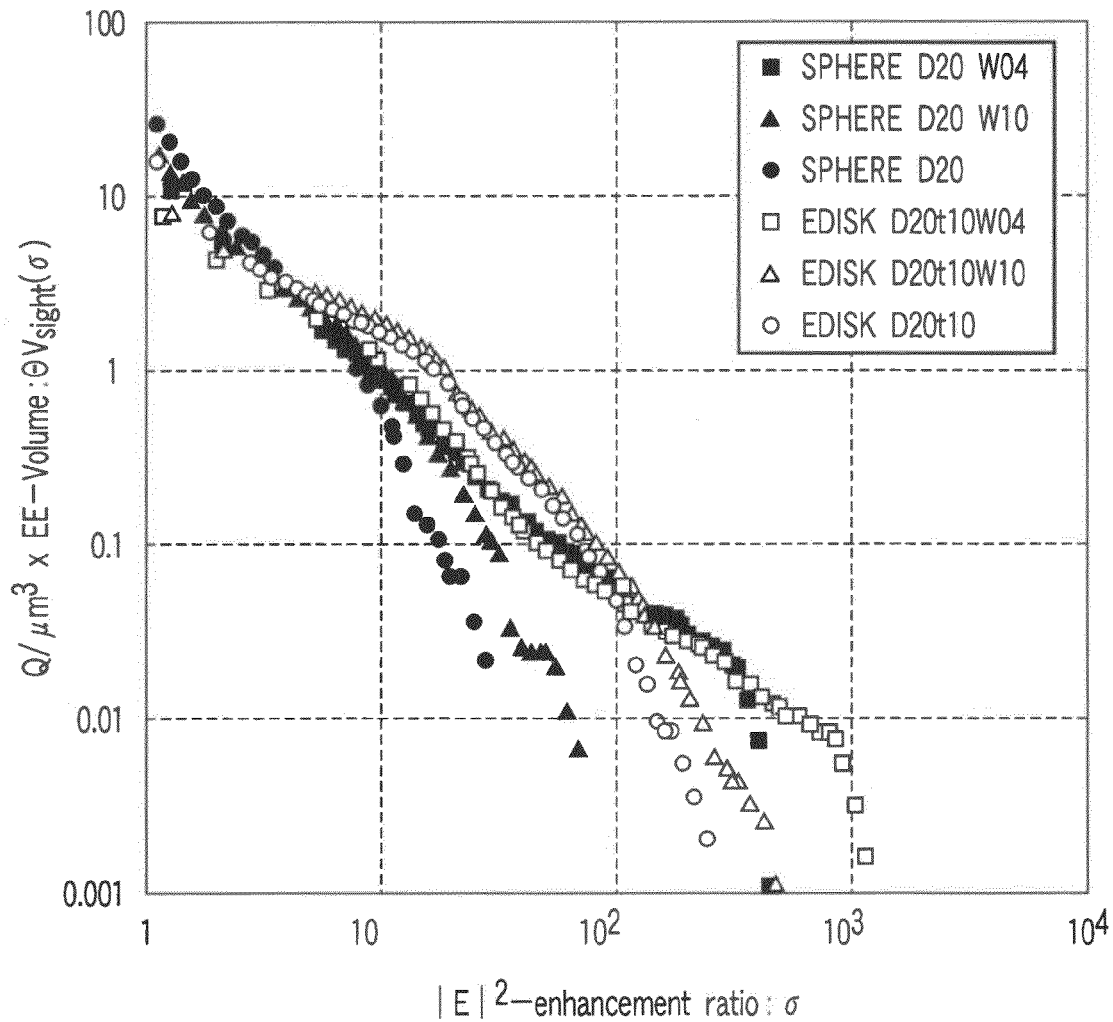
F I G. 16

OPTICAL RESONATOR WITH STRUCTURE TO IMPROVE MODE-PARTICLE INTERACTION

CROSS-REFERENCE TO RELATED APPLICATIONS

This application is based upon and claims the benefit of priority from prior Japanese Patent Application No. 2007-249652, filed Sep. 26, 2007, the entire contents of which are incorporated herein by reference.

BACKGROUND OF THE INVENTION

1. Field of the Invention

The present invention relates to an optical resonator in the fields of quantum information and optics.

2. Description of the Related Art

Upon implementation of a quantum computer using light or electromagnetic waves (to be simply referred to as light hereinafter), light needs to be associated with atoms, ions, quantum dots, and the like (to be simply referred to as particles hereinafter), which allow to preserve and manipulate quantum information, so as to preserve, manipulate, read, and so forth the quantum states of that computer. As one such method, a method of confining particles within an optical resonator, and coupling the resonance mode of the optical resonator and particles at a rate sufficiently higher (stronger) than a relaxation rate (decoherence rate: a rate at which normal quantum information is lost) of that system is available (for example, see JP-A 2001-209083 [KOKAI]). This resonance mode-particle coupling strength is observed as a Rabi oscillation. As one of important parameters that determine the Rabi oscillation, a mode volume of the optical resonator is known, and coupling becomes stronger with decreasing this value. However, in general, when the mode volume of the optical resonator becomes small, the photon lifetime ($\propto$ Q-value) of the optical resonator is shortened, thus increasing the relaxation rate of that system. Therefore, it is desired to implement an optical resonator, the mode volume and photon lifetime of which are well-balanced.

Currently, as high-performance optical resonators which may be suited to quantum information processing, a photonic crystal optical resonator, microsphere optical resonator, toroidal optical resonator, Fabry-Perot optical resonator formed by a high-performance DBR, and the like have been proposed (for example, see JP-A 2001-209083 [KOKAI], and Physical Review A, 2005, [vol. 71] 013817-1-10).

Upon implementation of a quantum computer, as an amount that gives an indication of limitations on its feasibility and performance, a ratio between a decoherence time (relaxation time) and arithmetic time (or quantum gate operation time), i.e., how many times a quantum gate operation can be performed until a system decoheres, gives an important indication. On the other hand, as a method of implementing a quantum computer, a method of using light or electromagnetic waves (to be simply referred to as light hereinafter) and using a coupling system of the resonance mode of an optical resonator and particles is known. Letting $\kappa$ be the attenuation rate of the optical resonator, $\gamma$ be the relaxation rate of particles, and g be the strength of resonance mode-particle coupling, since the quantum gate operation time is limited by g, satisfying $g > \kappa + \gamma$ serves as one guideline. Note that g is determined by the physicality unique to particles and the mode volume of the optical resonator. $\kappa$ is an inverse number of the photon lifetime of the resonance mode, which is determined by absorption, scattering, leakage, and the like of light in the optical resonator, and is in inverse proportion to a Q-value. $\gamma$ is the rate of relaxation of the quantum state in particles, and is determined by the physical systems and environment (crystal field, magnetic field, temperature, etc.) of particles.

Of the currently proposed optical resonators, a photonic crystal resonator has a small mode volume, but it is hard to say that its photon lifetime is sufficiently long, and available physical systems are limited. Conversely, a Fabry-Perot resonator can generally easily increase the photon lifetime. However, in this case, the mode volume of the Fabry-Perot resonator becomes larger than other resonators, and g is insufficient with respect to $\gamma$. As a microsphere resonator and toroidal resonator, those having high resonator performance can be obtained even in status quo, but further improvement of performance is demanded. Therefore, implementation of an optical resonator having a good relationship among g, $\kappa$, and $\gamma$ is demanded.

BRIEF SUMMARY OF THE INVENTION

In accordance with an aspect of the invention, there is provided an optical resonator comprising: a master resonator configured to resonate an electromagnetic wave; one structure or a pair of structures adjacent to each other, each of which is arranged at a position that overlaps one of resonance modes of the master resonator, is made up of a material in which a real part of a permittivity assumes a negative value, and an absolute value of the real part is larger than an absolute value of an imaginary part of the permittivity, and has a size which makes scattering that the electromagnetic wave suffers be Rayleigh scattering; and one or a plurality of particles, each of which is laid out near the structure by a distance smaller than the size of the structure.

In accordance with another aspect of the invention, there is provided an optical resonator comprising: a master resonator configured to resonate an electromagnetic wave; one structure or a pair of structures adjacent to each other, each of which is laid out at a position that overlaps one of resonance modes of the master resonator, is made up of a material having a permittivity with which a figure of merit that indicates a characteristic of the optical resonator is larger than 1, and has a size which makes scattering that the electromagnetic wave suffers be Rayleigh scattering; and one or a plurality of particles, each of which is laid out near the structure by a distance smaller than the size of the structure.

BRIEF DESCRIPTION OF THE SEVERAL VIEWS OF THE DRAWING

FIG. 8 shows scattering losses per structure with respect to an inter-structure distance in case of the layout of the structures in FIG. 6;

FIG. 15 is a graph showing the spatial volume with respect to the enhancement ratio of the electric field strength in some examples using different gaps in the examples of FIGS. 9 to 12; and FIG. 16 is a graph showing the spatial volume with respect to the enhancement ratio of the electric field strength upon multiplying the numerical values on the vertical axis of FIG. 15 by a Q-value per unit volume of losses (scattering and absorption) generated by a structure.

DETAILED DESCRIPTION OF THE INVENTION

Figure 1:
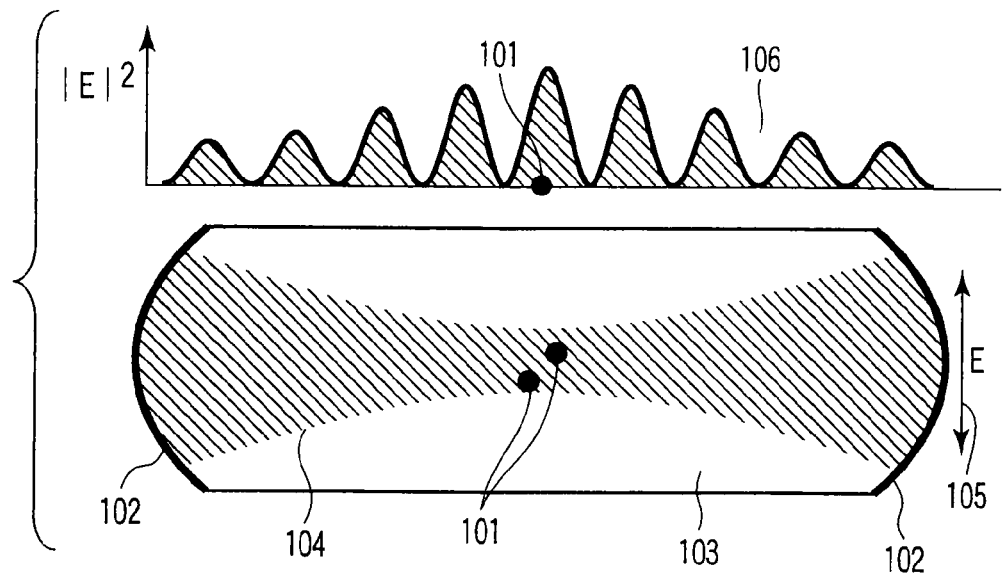
FIG. 1 is a view illustrating the electric field distribution of light inside an optical resonator.

An optical resonator according to an embodiment of the present invention will be described in detail hereinafter with reference to the accompanying drawings. In the embodiment to be described below, parts denoted by the same reference numerals make similar operations, and a repetitive description thereof will be avoided.

According to the optical resonator of this embodiment, a long photon lifetime as an advantage of an optical resonator with a large size, and the magnitude of a mode-particle interaction as an advantage of a micro optical resonator can be satisfied at the same time.

An overview of an optical resonator of this embodiment will be described first.

A model of a master resonator is selected. According to the intended purposes, material systems and physical systems to be used, and available process techniques, an appropriate resonator such as a large-size resonator obtained by grinding a bulk crystal, a micro photonic crystal nano resonator, or the like is selected. Alternatively, a planar optical circuit formed on a semiconductor substrate, a spherical resonator, or the like may be selected. Such resonator will be referred to as a "master resonator".

When light becomes incident on a structure, which is made up of a conductor of a noble metal or the like, and is as small as $1/10$ or less of the wavelength of light (to be simply referred to as a structure hereinafter), it is known that a local plasmon polariton is excited on the surface of this structure, and a near optical field with a strong electric field compared to that of the incident light is formed around the structure, and especially, in a direction of the electric field of the incident light (for example, see Motoichi Otsu and Kiyoshi Kobayashi, "Basics of Near-field light—New Optics for Nanotechnology", Ohmsha).

Therefore, when the aforementioned structure smaller than the resonance wavelength is laid out at a position that overlaps the electric field of the resonance mode of the aforementioned master resonator, the structure involves a strong electric field in the oscillation direction of the electric field in the resonance mode. The requirements of the structure are to have a small internal loss and a large dipole moment, and every materials can be candidates in addition to noble metals as long as a condition that a real part of a complex permittivity ($\epsilon=\epsilon'+i\epsilon''$) is negative ($\epsilon'<0$), and its imaginary part is small ($\epsilon''<|\epsilon'|$) is satisfied at the frequency of the resonance mode. For example, in a frequency domain lower than sub-THz, a super-conductive material of a sort can be used. Also, a plurality of structures may be used as a pair. Especially, when structures are juxtaposed to have a slight gap equal to or smaller than the size of the structure in the oscillation direction of the electric field (a direction that can be the oscillation direction if the oscillation direction cannot be defined), a stronger electric field is formed in that gap compared to that of the single structure.

Particles such as ions, atoms, quantum dots, and the like, which are required to record or manipulate quantum information (to be simply referred to as particles hereinafter) are laid out around this structure, and a strong electric field based on this near optical field is applied to these particles. At this time, enhancement of the electric field by the near field reaches several times to several hundred times compared to the original electric field of the resonance mode depending on designs and conditions. On the other hand, the influence range of the enhanced electric field is very small with respect to a space occupied by the resonance mode. For the particles, this enhanced electric field has no difference from that of the resonance mode of the master resonator. Therefore, the same effect as that when the resonance mode volume is simply decreased is relatively obtained, and coupling between the resonance mode and particles by photons can be strengthened.

At this time, the structure causes losses due to scattering and absorption. However, whether or not these losses impose significant influences is determined by the Q-value, mode volume, and the like of the resonance mode of the master resonator, and a useful effect can be obtained by carefully designing the configuration and the number of structures. By arranging the structures periodically or to have a layout having a regularity with a specific intention, a design that make scattered waves interfere with each other to cancel each other or to be focused in a specific direction is available, thus allowing suppression of scattered light and control of the scattering direction. When the resonator itself is small, the same effect can be expected by regularly arranging such resonators themselves.

(Principle)

A most important index upon implementation of a quantum computer is how many times a quantum gate operation can be performed before quantum information of a quantum bit is lost. In a quantum computer using an optical resonator, the possible number of quantum gate operation times $\propto g/(\kappa+\gamma)$, and how to increase this value is one issue.

The basic principle will be described first. Note that parameters used are defined as Table 1.

TABLE 1

| | Characteristic value |
|---|---|
| g | Coupling strength between resonance mode particle \| exchange rate of energy (synonymous) |
| κ | Attenuation rate of resonator \| inverse number of photon lifetime \| decoherence rate by resonator \| loss rate (synonymous) |
| γ | Relaxation rate of particle \| decoherence rate by particle (synonymous) |
| | Parameters associated with optical resonator as basis (in primary state without structure) |

TABLE 1-continued

| | |
|---|---|
| $V_{mode}$ | Mode volume of resonance mode used |
| $Q_{mode}$ | Q value of resonance mode used |
| | Parameters associated with structure |
| $N_{str}$ | Number of structures |
| σ | Enhancement ratio of electric field strength by structure |
| $V_{sight}(\sigma)$ | Volume of space in which enhancement ratio of electric field strength becomes · times or more |
| Θ | Q value per unit volume of losses (scattering and absorption) generated by structure |
| $Q_{str}$ | Value obtained by converting absorption losses and scattering losses per unit volume by structure into Q value |
| | Parameters associated with particle |
| $N_{par}$ | Number of effective particles (which receive intended electric field action) |
| $\rho_{par}$ | Number of particles per unit volume Index value |
| F | Figure of merit of $g/(\kappa + \gamma)$ |

Note that g and κ are expressed by the following Equations. Also, ω and Q respectively represent the resonance angular frequency and Q-value of the resonance mode.

$$\kappa = \frac{\omega}{Q} \quad (1)$$

$$g = A\sqrt{\frac{1}{V_{mode}}} \quad (2)$$

where A is a unique coefficient determined by the physical system (the type of particle, energy level used, physical phenomenon used, etc) of the particle used. Note that γ is a value unique to the physical system. $V_{mode}$ represents the mode volume of the resonator, and is normally defined by:

$$V_{mode} = \frac{\int_V \varepsilon(r)|E(r)|^2 d^3 r}{\max(\varepsilon(r)|E(r)|^2)} \quad (3)$$

Therefore, the strength of coupling between the particles and resonance mode is determined by only the mode volume if the physical system used is determined. However, the right-hand side of Equation 3 is standardized by the strongest electric field of the resonance mode, and the coupling strength of particles located at positions where the electric field is not strongest suffers a proper drop. Equation 2 can be considered as a ratio of electric fields present at the positions of particles of electric field energies of photons within the resonance mode, i.e., the ratio of the electric fields of the overall resonance mode, which overlap the particles. That is, as an equivalent mode volume that each particle senses, the denominator of the right-hand side of Equation 3 defines the electric field strength at the position of the particle, and a particle located at a position of a weak electric field of the mode senses a mode volume larger than actual one.

Figure 2:
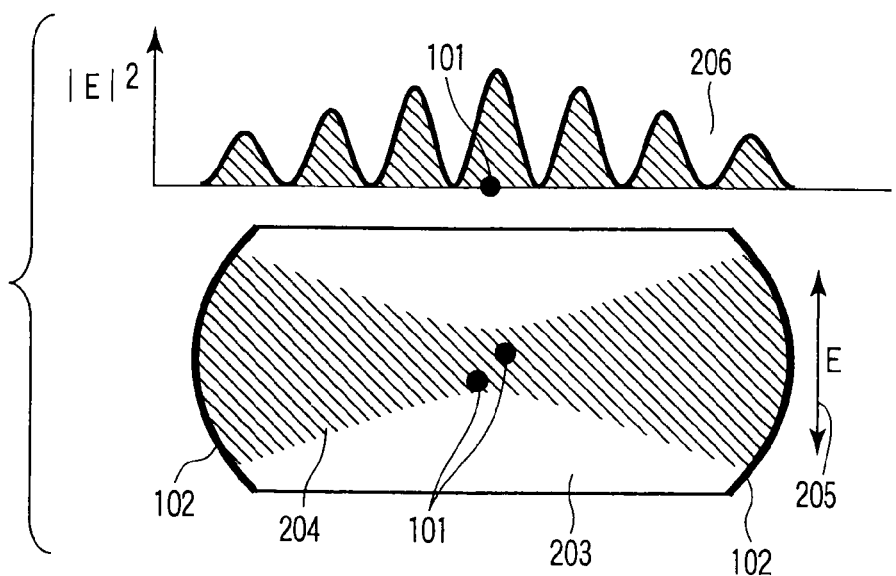
FIG. 2 is a view illustrating the electric field distribution of light when the longitudinal direction of the optical resonator is reduced to decrease the spread of a mode.
Figure 3:
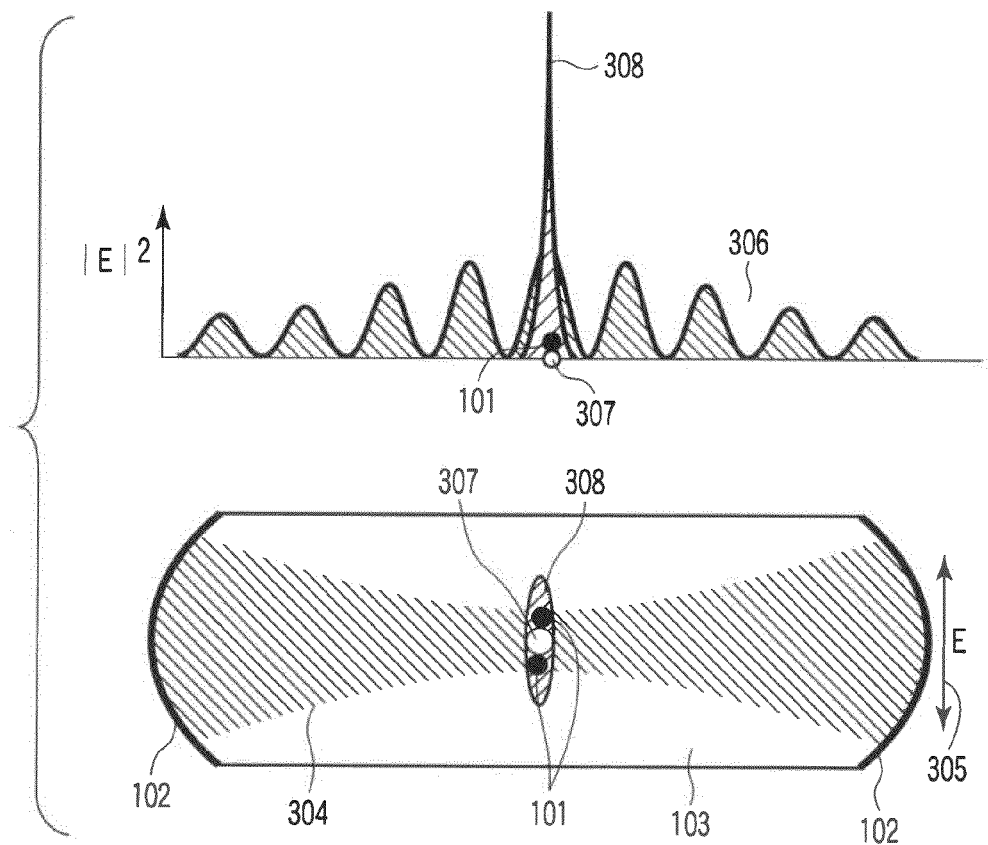
FIG. 3 is a view illustrating the electric field distribution of light of an optical resonator according to an embodiment.

The design method of the optical resonator will be described below with reference to FIGS. 1 to 3. FIG. 1 is a view illustrating the electric field distribution of light inside an optical resonator 103.

The conventional design method of an optical resonator will be described first. In order to increase g, the mode volume needs to be decreased. However, the conventional method focuses on a reduction in spread of the mode by reducing the volume of the optical resonator itself, as shown in FIG. 2. That is, the spread of an electric field distribution 106 in FIG. 1 is reduced to that of an electric field distribution 206 in FIG. 2. FIG. 2 shows a method of reducing the longitudinal size of the optical resonator compared to the optical resonator 103 in FIG. 1, but the crosswise size, i.e., the diameter of the resonance mode may be reduced. This design method corresponds to a method of increasing g/κ by designing to reduce a distribution range of electric fields E in Equation 3, i.e., an integration range of the numerator of the right-hand side of Equation 3. However, a reduction of the mode volume by this method often results in a Q-value drop due to a decrease in round length of the resonance mode, an increase in diffraction loss, and the like, and the expected effects cannot be obtained since effects cancel each other depending on physical systems used. Especially, a Fabry-Perot resonator is often designed rather to have a large resonator length to obtain a high Q-value. However, when the resonator becomes large, since g also becomes small in turn as well as κ, a limit is determined by the value γ. Note that a method of squeezing a beam waist of the standing wave mode, which is popularly used, increases the denominator of Equation 3, but it poses the same problem in terms of an increase in diffraction loss.

Figure 4:
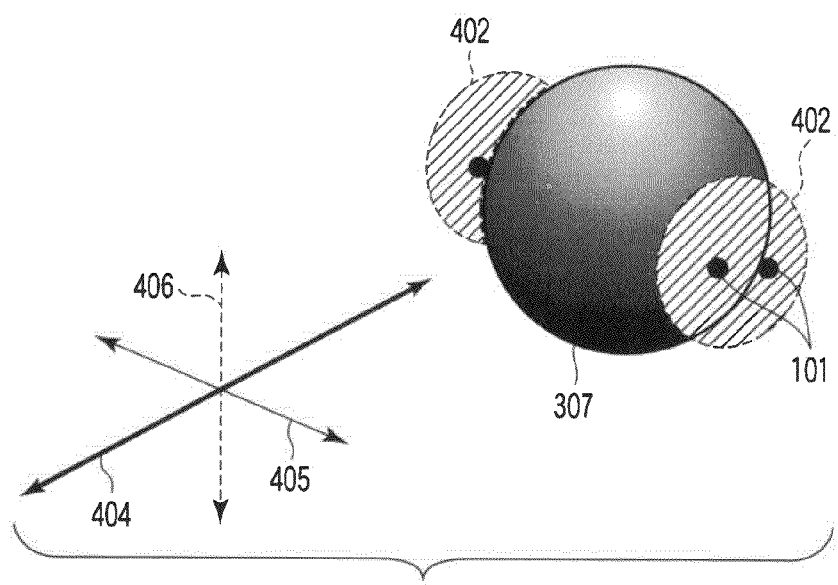
FIG. 4 is a view showing regions, in which an electric field is enhanced around a structure arranged in the optical resonator shown in FIG. 3.

The design method of an optical resonator according to this embodiment will be described below with reference to FIGS. 3 and 4.

In the optical resonator of this embodiment, a "structure", which is smaller than the resonance wavelength of that optical resonator and is made up of a material in which a real part of the permittivity becomes negative with respect to light of the resonance frequency, is laid out in the optical resonator 103. FIG. 3 is a view illustrating a case in which this embodiment is applied to the resonator shown in FIG. 1. Since the sign of the real part of the permittivity inside this structure 307 is opposite to that outside the structure 307, a low-dimensional light wave 308 which locally exists on this interface is excited upon incidence of light. This is also called a surface plasmon polariton (SPP), which forms a strong electric field around the structure. When the structure has a spherical shape, strong electric field concentrations are observed on regions 402 in FIG. 4. A particle 101, which is located near this structure and influenced by the strong electric field concentration, senses a relatively small mode volume, since the denominator of the right-hand side of Equation 3 increases. The particle 101 is laid out in the region 402 where the strong electric concentration is observed. That is, the particle 101 is laid out so that a direction from the structure 307 located at the nearest position to the particle 101 agrees with directions of electric fields in the resonance modes or directions of the electric fields in one or more of degenerate resonance modes, and the distance between the particle 101 and the structure 307 located at the nearest position is equal to or smaller than the half the size of the structure. One or a plurality of particles are arranged, and have a dipole moment different from other parts inside the master resonator with respect to the frequency of the resonance mode. On the other hand, since the spread range of this strong electric field is a very narrow range near the structure, the contribution to the numerator of the right-hand side of Equation 3 as a spatial integration value is negligible, and the numerator of the right-hand side of Equation 3 normally has nearly no increase. Therefore, the mode volume can be reduced without changing the size of the resonator.

At this time, since the structure has significant absorption and scattering, a slight Q-value drop occurs. However, by carefully designing the size and position of the structure, the number of structures, and the like, a resonator can be configured without largely decreasing the Q-value of the master resonator. For example, the size of the structure is set so that scattering by the structure is considered as Rayleigh scattering. In other words, the size of the structure is set to be equal to or smaller than around D of a resonance wavelength. Note that $D=0.4\lambda/\pi n$ (where $\lambda$ is the resonance wavelength, n is the refractive index of a medium in the resonator, and $\pi$ is the circle ratio). With this size of the structure, the size can be suppressed so that scattering by the structure is considered as Rayleigh scattering. Also, by arranging a plurality of structures at periods (about half to several times) of the wavelength of the resonance mode, scattered waves can interfere with each other, and the direction and amount of scattering can be controlled and suppressed by the same effect as a diffraction grating.

Note that degeneracy indicates a state in which a plurality of eigenvectors corresponding to a certain eigenvalue exist in an eigenvalue problem. Since a plurality of resonance modes respectively have specific resonance frequencies (=eigenvalues), and specific spatial distributions (=eigenvectors), the directions of electric fields at respective points in the resonator are generally uniquely determined if the resonance mode is determined. However, depending on the structures of resonators or the types of resonance modes, resonance modes which have different spatial distributions but the same resonance frequency (or including a case in which resonance frequencies are considered as "the same frequency" since they are closer to each other than the line width of resonance modes and are undiscriminable in effect) exist. These resonance modes are called degenerate resonance modes. In this case, the direction (and strength) of the electric field at each point changes depending on which of a plurality of resonance modes is to be excited. More specifically, such modes correspond to, e.g., a Gaussian mode of linear polarization, which resonates with every polarized radiations and has a circular aperture.

One problem upon actually manufacturing the optical resonator of this embodiment is to have to control the distance between the particle and structure. For example, as described above, the particle has to be located near the structure by a distance equal to or smaller than the radius of the structure. In order to solve this problem, it is efficient to prepare an object as a combination of particles and a structure in advance from the beginning, and to place that object in the resonator. In addition, a method of placing a structure in a resonator mixed with particles may be used. However, with this method, since particles located at positions where they do not receive any effects of the optical resonator of this embodiment may impair the performance of the optical resonator, and such unwanted particles preferably do not exist, an object as a combination of the particles and structure is prepared. As a method of preparing this "object as a combination of the particles and structure", for example, the following methods are available:

particles are electrostatically attached to the structure surface (example: particles are attached to a nano metal particle coated with an organic polymer, or particles each enclosed in a dielectric are attached to a nano metal particle);
  the structure surface is modified by particles (or molecules including atoms that form particles) (example: upon coating a nano metal particle with an organic polymer, a material that serves as particles is mixed in the organic polymer);
  an object in which the structure and particles are integrated and molecularized (or crystallized) is prepared (example: a buffer layer is stacked on the surface of an oxide super-conductive crystal, and quantum dots serving as particles are formed on the buffer layer); and so forth.

In this way, by forming a new structure that physically integrates a combination of the particles and structure by the method of attachment, modification, molecularization, or the like of the particles with respect to the structure, the positional relationship between the particles and structure can be easily controlled.

Suppression of light scattering will be described below with reference to FIGS. 5, 6, 7, and 8.

Figure 5:
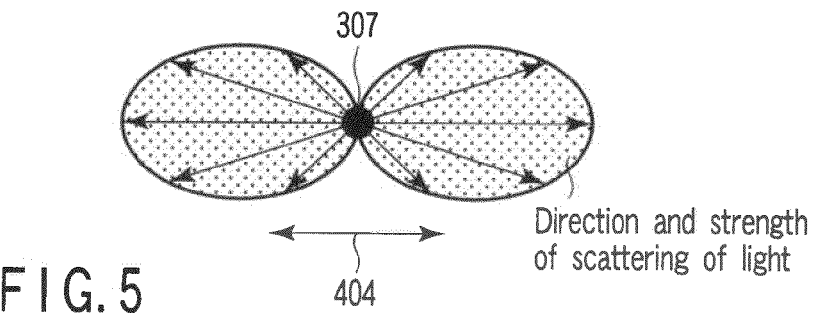
FIG. 5 shows a typical light scattering pattern with respect to a structure.
Figure 6:
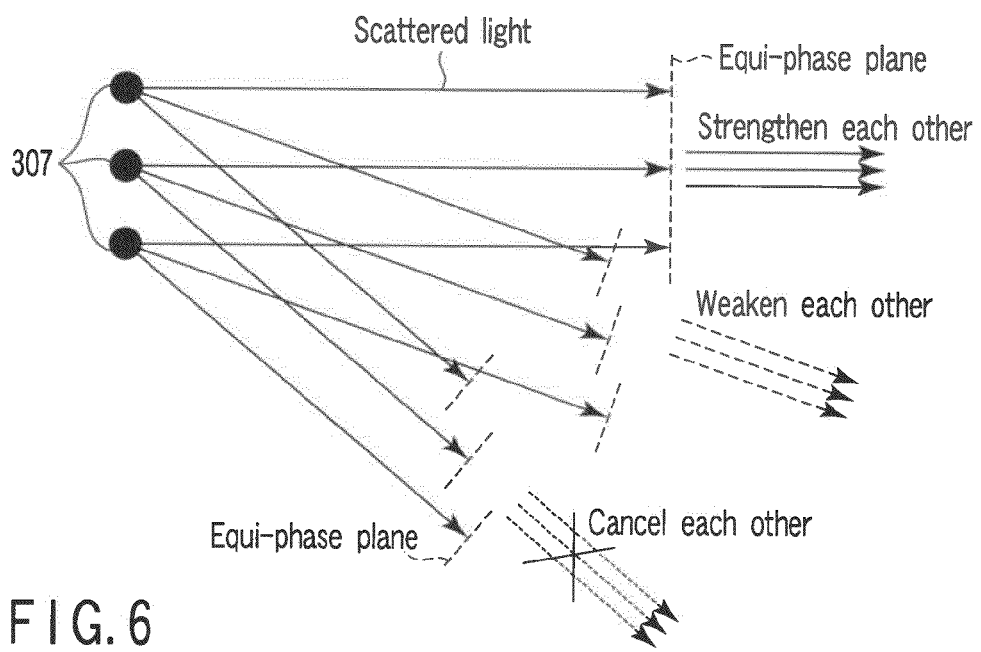
FIG. 6 shows a state in which scattering is suppressed when structures are juxtaposed in a direction perpendicular to incident light.
Figure 7:
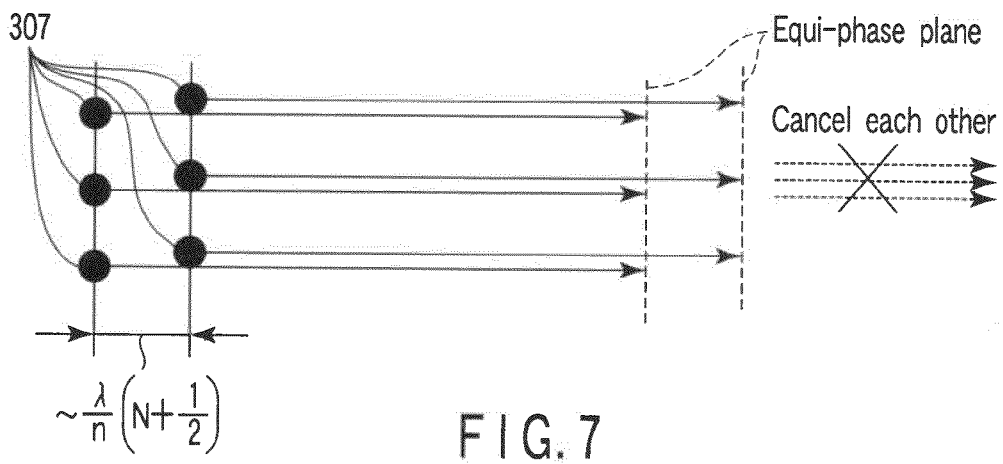
FIG. 7 shows a state in which scattering is suppressed when structures are juxtaposed in an incoming direction of incident light.

FIG. 5 shows a typical light scattering pattern by a single structure 307, and scattered light is generated in the back-and-forth directions with respect to a propagation direction (resonance direction of the resonance mode) 404 of light in the resonance mode. As shown in FIG. 6, when structures 307 are juxtaposed in a direction (crosswise direction) perpendicular to incident light of the resonance mode, vertical direction components of scattered light cancel and weaken each other. As shown in FIG. 7, when structures 307 are juxtaposed in a direction (i.e., an incident direction) parallel to incident light of the resonance mode, scattered light components interfere with each other, thus suppressing scattering. In FIG. 7, the structures 307 are juxtaposed in the resonance direction to have a gap as a half-integral multiple of the resonance wavelength.

FIG. 8 shows the calculation result of scattering losses per structure in the layout shown in FIG. 6. FIG. 8 shows a ratio with respect to scattering losses in case of a single structure, and when the ratio<1, it represents that the scattering losses are suppressed by the layout. As can be seen from FIG. 8, when the distance between the neighboring structures falls within ranges of 0.5 to 0.9 times and 1.6 to 2.0 times the resonance wavelength, the suppression effect can be obtained independently of the number of structures. Note that losses due to scattering and those due to absorption are represented together by $Q_{str}$.

Subsequently, the design method will be described in more detail below. Let $V_{sight(\sigma)}$ be the volume of a space that can obtain an electric field strength $\sigma$ times the electric field of the resonance mode for one structure, $N_{str}$ be the number of structures (or the number of pairs of structures), and $\rho_{par}$ be the number of particles per unit volume in the resonator (or around the structure). Then, the number of particles subjected to the action of the $\sigma$-fold electric field strength is described by:

$$N_{par}=N_{str}V_{sight(\sigma)}\rho_{par} \quad (4)$$

However, when particles such as quantum dots or the like, each having a nonnegligible or equivalent size compared to the structure, are used, $N_{par}=N_{str}$ or $2N_{str}$ in consideration of a practical problem and symmetry.

At this time, if excessive losses generated in the resonator due to placement of the structures are expressed by a Q-value, losses corresponding to:

$$Q_{str} = \frac{\Theta}{N_{str}}V_{mode} = \frac{\Theta V_{sight}(\sigma)}{N_{par}}V_{mode}\rho_{par} \quad (5)$$

are generated. Assume that $\Theta$ represents losses per structure (or pair) with respect to a unit volume as a Q-value. Since the Q-value is also a ratio of energy accumulated in the resonator and the dissipation rate of energy, a Q-value per unit volume can be defined if the losses are determined. The losses are defined by $\kappa_{str}/\omega$). Note that $\kappa_{str}=\omega/Q_{str}$, and indicates a loss rate.

Letting g and $\kappa$ be the coupling strength and attenuation rate of the master resonator in a primary state (indicating a case in which the resonator includes neither structures nor particles), and g' and $\kappa$' be the coupling strength and attenuation rate of the optical resonator of this embodiment, g' and $\kappa$' can be respectively expressed by:

$$g' = \sqrt{\sigma g} \quad (6)$$

$$\kappa' = \left(1 + \frac{Q_{mode}}{Q_{str}}\right)\kappa \quad (7)$$

According to the optical resonator of this embodiment, $\sigma>1$. However, since $Q_{mode}/Q_{str}>0$ ($Q_{mode}\neq 0$), the attenuation rate of the resonator increases with increasing coupling strength. If the figure of merit of the characteristics according to this embodiment compared to the condition before placement of the structures based on these Equations (6 and 7) is defined by F, we have:

$$\frac{g'}{\kappa'+\gamma} = \frac{\sqrt{\sigma}g}{\left(1+\frac{Q_{mode}}{Q_{str}}\right)\kappa+\gamma} = F\frac{g}{\kappa+\gamma} \quad (8)$$

Therefore, by designing the resonator to meet:

$$F = \frac{\sqrt{\sigma}}{\left(1+\Delta\frac{\kappa}{\kappa+\gamma}\right)} > 1 \quad (9)$$

$$\left(\Delta = \frac{Q_{mode}}{Q_{str}} = \frac{N_{str}Q_{mode}}{\Theta V_{mode}} = \frac{N_{par}Q_{mode}}{\Theta V_{sight}(\sigma)V_{mode}\rho_{par}}\right)$$

effective effects can be obtained, and the effects become more conspicuous with increasing F.

First Embodiment

The configuration of a structure will be described first with reference to FIGS. 9, 10, 11, and 12.

Figure 11:
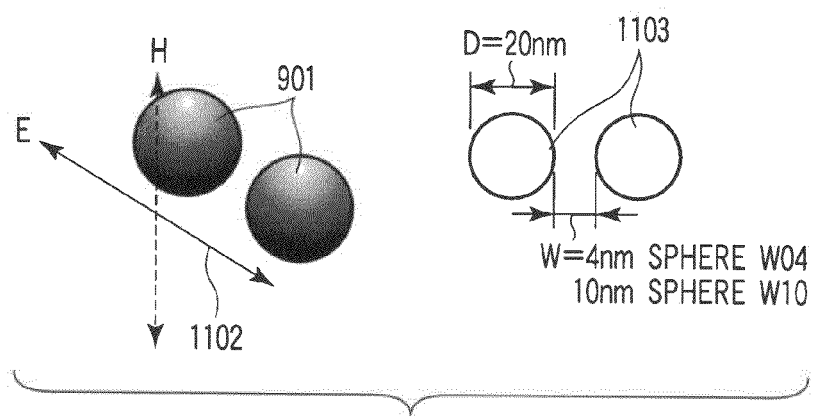
FIG. 11 is a view showing an example in which two structures shown in FIG. 9 are juxtaposed.
Figure 12:
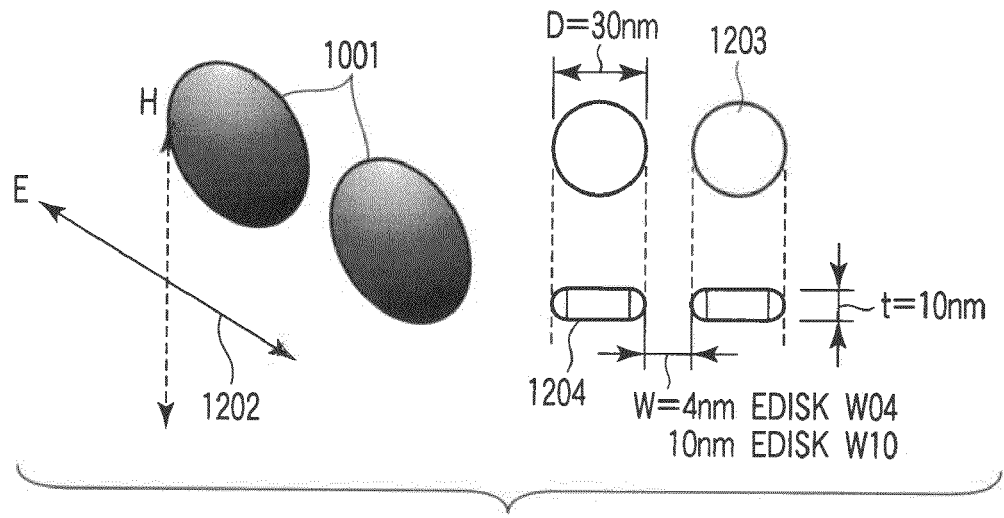
FIG. 12 is a view showing an example in which two structures shown in FIG. 10 are juxtaposed.

A structure is configured using silver (Ag), and its complex refractive index is set to be n=0.06 to 4.016j (complex relative permittivity ∈=−17.3 to 0.5j) around a wavelength of 600 nm. The structure size is set to be a size that allows scattering to be considered as Rayleigh scattering so as to minimize the influence of scattering. The characteristics of the structure largely change depending on not only the size but also its shape, the frequency of light, and a surrounding medium. However, in this embodiment, assume that the resonance mode wavelength is 600 nm, and the refractive index of the medium that forms the resonator is n=1.81 (relative permittivity ∈=3.28). This embodiment relates to a structure 901 as a sphere having a diameter of 20 nm shown in FIG. 9 (to be referred to as "SPHERE" hereinafter), a structure 1001 as a flat sphere having a diameter of 30 nm and a thickness of 10 nm shown in FIG. 10 (to be referred to as "EDISK" hereinafter), and optical resonators in which two these structures are juxtaposed to have a small gap, as shown in FIGS. 11 and 12. FIG. 11 shows SPHERE W04 and SPHERE W10 respectively having gaps of 4 nm and 10 nm, and FIG. 12 shows EDISK W04 and EDISK W10 respectively having gaps of 4 nm and 10 nm.

Figure 10:
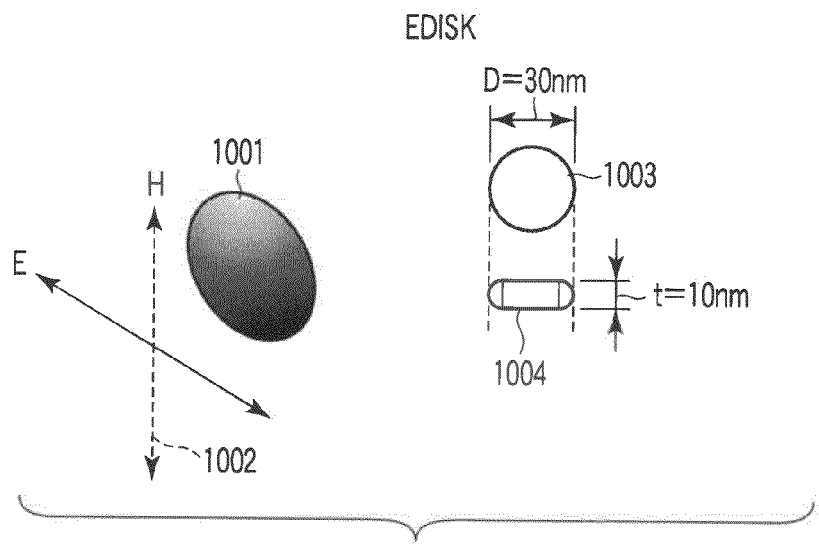
FIG. 10 is a view showing an example of a structure according to the embodiment.

In case of the structure 1001 shown in FIG. 10, the sectional area of the structure 1001 indicates a circle in the traveling direction of a light wave (a direction perpendicular to the oscillation direction of the electric field and magnetic field) (1003), and a flat body in the oscillation direction of the magnetic field (1004), as shown in FIG. 10. When the structures 901 are paired, as shown in FIG. 11, the sectional areas of the structures 901 indicate circles in both the traveling direction of a light wave and the oscillation direction of the magnetic field, as shown in FIG. 11. When the structures 1001 are paired, as shown in FIG. 12, the sectional areas of the structures 1001 indicate circles in the traveling direction of a light wave (a direction perpendicular to the oscillation direction of the electric field and magnetic field) (1203) and flat bodies in the oscillation direction of the magnetic field (1204), as shown in FIG. 12, as in the case described with reference to FIG. 10. Furthermore, in case of the structures which are not perfect spheres, as shown in FIGS. 10 and 12, a direction of the maximum dimension of each structure agrees with the oscillation direction of the electric field.

Figure 9:
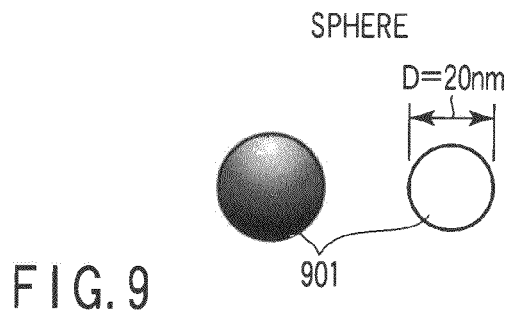
FIG. 9 is a view showing an example of a structure according to the embodiment.

The electric field distribution around the structure 901 shown in FIG. 9 and that around the two juxtaposed structures 1001 shown in FIG. 12 will be respectively described below with reference to FIGS. 13 and 14. Note that these electric field distributions were calculated by a finite-difference time-domain method (RC-FDTD method) in consideration of a dispersive medium. The distributions of the electric fields around the structure are represented in contours.

Figure 13:
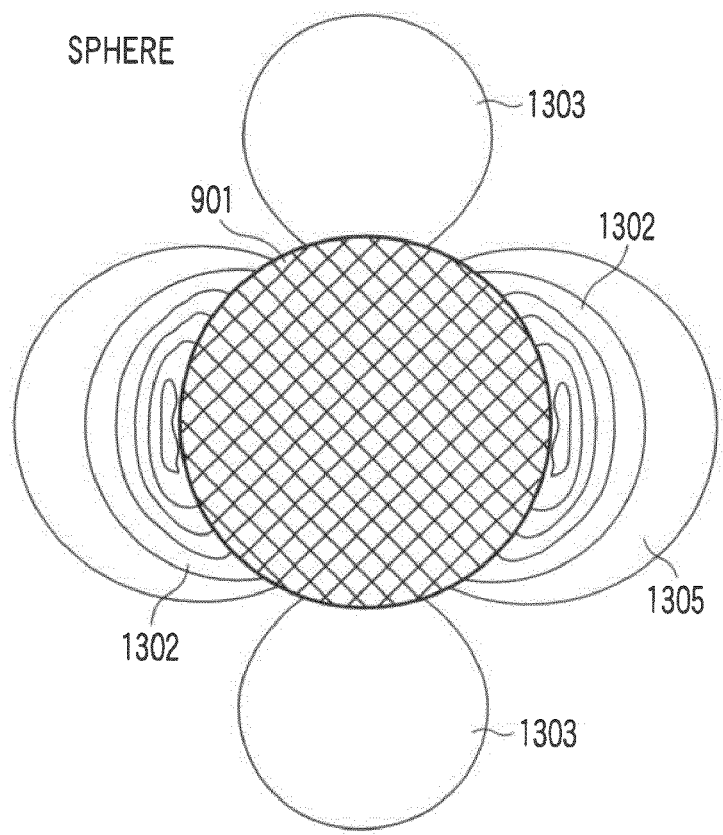
FIG. 13 is a view showing the electric field distribution around the structure in FIG. 9.
Figure 14:
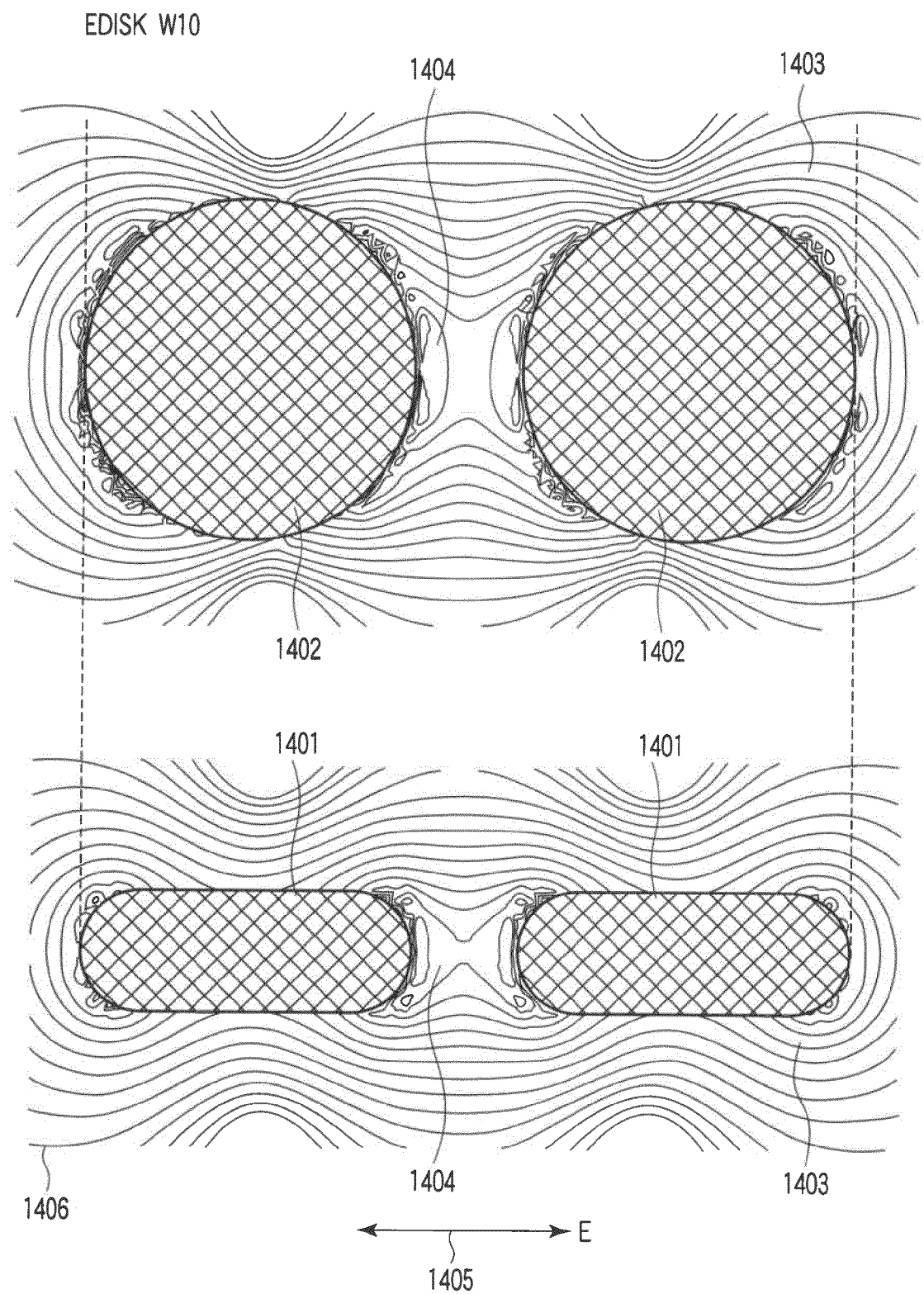
FIG. 14 is a view showing the electric field distribution around the structures shown in FIG. 12.

The strength changes equally per scale of the contours in FIG. 13 with respect to the electric field of the resonance mode of the master resonator near the structure in a near optical field 1302. In near optical fields 1403 and 1404, an exponential indication is adopted, and the strength changes 10 times per three scales (two-odd times per scale). A flat part sufficiently separated from the structure has nearly no contribution of the structure, and has a roughly equal electric field strength with respect to the original resonance mode. Also, in case of the plurality of juxtaposed structures in FIG. 14 (1401, 1402), concentration of the electric field in the gaps is especially conspicuous.

The relationship between the electric field strength and a space occupied by the electric field strength will be described below with reference to FIG. 15. Especially, Table 2 below shows $V_{sight}$ values for $\sigma$=10 and $\sigma$=100.

TABLE 2

|  | $\Theta[\mu m^{-3}]$ | $V_{sight}(\sigma = 10)$ [nm³] | $V_{sight}(\sigma = 100)$ [nm³] |
|---|---|---|---|
| Sphere Analytic solution | — | $6.8 \times 10^2$ | — |
| Sphere | $8.97 \times 10^5$ | $6.6 \times 10^2$ | — |
| Sphere W04 | $1.34 \times 10^5$ | $6.8 \times 10^3$ | $4.3 \times 10^2$ |
| Sphere W10 | $2.82 \times 10^5$ | $3.5 \times 10^3$ | — |
| EDISK | $6.28 \times 10^4$ | $2.6 \times 10^4$ | $7.5 \times 10^2$ |
| EDISK W04 | $5.00 \times 10^4$ | $2.3 \times 10^4$ | $9.9 \times 10^2$ |
| EDISK W10 | $4.67 \times 10^4$ | $3.1 \times 10^4$ | $1.4 \times 10^3$ |

FIG. 15 and Table 2 also show the analytic calculation result for a sphere alone, but they show results very well accorded with those of FDTD and prove the validity of the calculation method. Table 2 describes the calculation results of $\Theta$ for respective configurations. First and last, as can be seen from Table 2, both the electric field enhancement ratio and losses are low for the sphere types, while they are high for the flat sphere types. In these structures, since the Q-value, enhancement ratio, and the volume of the space that can be enhanced have a tradeoff relationship, estimation is easily made to handle the values $\Theta \times V_{sight(\sigma)}$ rather than the values $\Theta$ alone. Hence, FIG. 16 shows the relationship between $\Theta V_{sight(\sigma)}$ and $\sigma$ calculated from FIG. 15. As can be seen from the examination based on this calculation result, it is the best to use a flat sphere for the electric field enhancement ratio falling with a range from 5 times to 100 times, Sphere for less than 5 times, and a structure pair for more than 100 times. Note that FIG. 16 describes the calculation result for the flat sphere when light becomes incident toward a planar part. However, in practice, the direction of the flat sphere can be arbitrary as long as the radial direction agrees with the direction of the electric field.

Second Embodiment

The second embodiment will take as an example a resonator based on a Fabry-Perot resonator formed by a high-reflectance distributed Bragg reflector (DBR) to have a yttria silicate ($Y_2SiO_2$, to be referred to as "YSO" hereinafter) single crystal as a base material. Assume that particles are Pr (praseodymium) ions mixed in the YSO. In case of ions, the coefficient A in Equation 2 is given by:

$$A = \sqrt{\frac{\mu^2 \omega}{4\pi \hbar \varepsilon_0 \varepsilon_r}} \quad (10)$$

where $\mu$ is the dipole moment of an ion, $\omega$ is the angular frequency of the resonance mode, h is Planck's constant, $\varepsilon_0$ is a vacuum permittivity, and $\varepsilon_r$ is a relative permittivity at the position of an ion in the resonator.

As the dipole moment, $\mu = 9.0 \times 10^{-32}$ [Cm] is used as a maximum value of those estimated by experiments, and a length L=9 mm of the resonator, a medium refractive index n=1.818, a wavelength $\lambda$=606 nm of light, and a reflectance R=99.996% of the DBR. Also, a case will be examined wherein as the resonance mode of the master resonator, a lateral mode is the Gaussian basic mode, and a beam waist w=10 μm or w=5 μm (i.e., a high NA mode in which the beam waist diameter is barely different from a spot diameter on a mirror). At this time, $Q_{mode}=8.5 \times 10^9$, $V_{mode(w=5\ \mu m)}=1.77 \times 10^5\ \mu m^3$, and $V_{mode(w=10\ \mu m)}=7.07 \times 10^5\ \mu m^3$.

Structures described in the first embodiment were used. Note that $Pr^{3+}$ doped in the YSO is coordinated in the crystal by substitution with Y (yttrium atoms). Upon calculating from the density=4.45 g/cm³ of the YSO, the number of Y ions is two per volume=0.017 nm³ of a unit crystal, and $\rho_{par}$=18.7 particles/nm³.

The performance of this optical resonator is estimated from the actually required number of quantum bits. If the required number of $Pr^{3+}$ ions is around 50, and its concentration is 0.1% as a ratio with respect to Y, $N_{par}=1 \times 10^5$ is required. SPHERE and EDISK-W10 type structures were selected with reference to FIG. 15, and were examined for $\sigma$=10 and $\sigma$=100. Table 3 below shows the calculation results based on $V_{mode\ (w=5\ \mu m)}$ and Table 4 below shows the calculation results based on $V_{mode\ (w=10\ \mu m)}$.

TABLE 3 w = 5 μm

| | F | κ | g | g/κ | g/γ | Number of structures | Number of Qbits |
|---|---|---|---|---|---|---|---|
| Original resonator | — | 367 kHz | 152 kHz | 0.42 | 15 | — | — |
| Sphere σ = 10 | 2.41 | 484 kHz | 481 kHz | 0.99 | 48 | 6 | 53 |
| EDISK-W10 σ = 10 | 1.58 | 743 kHz | 481 kHz | 0.65 | 48 | 1 | 417 |
| EDISK-W10 σ = 100 | 2.50 | 1.50 MHz | 1.52 MHz | 1.02 | 152 | 3 | 56 |

TABLE 4 w = 10 μm

| | F | κ | g | g/κ | g/γ | Number of structures | Number Of Qbits |
|---|---|---|---|---|---|---|---|
| Original resonator | — | 367 kHz | 76.0 kHz | 0.21 | 7.6 | — | — |
| Sphere σ = 10 | 2.93 | 396 kHz | 240 kHz | 0.61 | 24 | 6 | 53 |
| EDISK-W10 σ = 10 | 3.08 | 461 kHz | 240 kHz | 0.52 | 24 | 1 | 417 |
| EDISK-W10 σ = 100 | 5.71 | 649 kHz | 760 kHz | 1.17 | 76 | 3 | 56 |

As can be apparent from these results, the performance of the resonator can be improved by introducing the structures. Especially, under the conditions of E-DISK W10 and $\sigma$=100, the values of g/(κ+γ) exceed 1, i.e., 1.01 and 1.15 for the beam waist w=5 μm and w=10 μm. This is called a strong coupling condition, and has a major significance upon handling quantum phenomena.

According to the aforementioned embodiments, even when a large-size optical resonator which can be relatively easily have technical advantages is used as a source, when a structure whose permittivity and size are adjusted is laid out in a master resonator, and particles are also laid out around the structure, the coupling strength g can be raised to about several times to several ten times while leaving a merit of a long photon lifetime.

As a secondary effect, since the symmetry of the electric fields in spaces around the particles is broken due to placement of the structure, excitation of the particles in a multipole mode is expected and this appears as an increase in g. At the same time, a change in energy level can be expected although it is a slight amount. By exploiting the locality of the structure in the resonator and the eccentricity of the electric fields formed around the structure, a manipulation method of controlling the quantum states of the particles in the single resonator for respective places is allowed.

These effects are useful for implementation of a quantum computer using light.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical resonator comprising:
a master resonator configured to resonate an electromagnetic wave;
one structure or a pair of structures adjacent to each other, each of which is arranged at a position that overlaps one of resonance modes of the master resonator, the one structure or the pair of structures being made up of a material in which a real part of a permittivity assumes a negative value, and an absolute value of the real part is larger than an absolute value of an imaginary part of the permittivity, the one structure or the pair of structures having a size which makes scattering that the electromagnetic wave suffers be Rayleigh scattering; and
one or a plurality of particles, each of which is laid out near the structure by a distance smaller than the size of the structure,
wherein the structure has a shape which is not a perfect sphere, and the structure is laid out in a direction in which a direction of a maximum dimension of the structure agrees with directions of electric fields in the resonance modes or directions of electric fields in one or more of degenerate resonance modes.

2. An optical resonator comprising:
a master resonator configured to resonate an electromagnetic wave;
one structure or a pair of structures adjacent to each other, each of which is arranged at a position that overlaps one of resonance modes of the master resonator, the one structure or the pair of structures being made up of a material in which a real part of a permittivity assumes a negative value, and an absolute value of the real part is larger than an absolute value of an imaginary part of the permittivity, the one structure or the pair of structures having a size which makes scattering that the electromagnetic wave suffers be Rayleigh scattering; and
one or a plurality of particles, each of which is laid out near the structure by a distance smaller than the size of the structure,
wherein one or a plurality of pairs of the structures are scattered in the master resonator and are laid out at a position, at which an enhancement ratio of an electric field intensity becomes larger than 1, of an electric field distribution of the resonance modes, and
each of the particles is laid out so that a direction from the structure to each of the particles agrees with directions of electric fields in the resonance modes or directions of electric fields in one or more of degenerate resonance modes, and a distance between each of the particles and the structure is not more than a half of the size of the structure, the structure being located at a nearest position from each of the particles.

3. The resonator according to claim 2, wherein a positional relationship between each of the particles and the structure is set by forming a new structure which is physically integrated by attachment, modification, or molecularization of each of the particles to the structure.

4. An optical resonator comprising:
a master resonator configured to resonate an electromagnetic wave;
one structure or pairs of structures adjacent to each other, each of which is arranged at a position that overlaps one of resonance modes of the master resonator, the one structure or the pair of structures being made up of a material in which a real part of a permittivity assumes a negative value, and an absolute value of the real part is larger than an absolute value of an imaginary part of the permittivity, the one structure or the pair of structures having a size which makes scattering that the electromagnetic wave suffers be Rayleigh scattering; and
one or a plurality of particles, each of which is laid out near the structure by a distance smaller than the size of the structure,
wherein at least some of the pairs of the structures are laid out so that a distance between some of the pairs of the structures has a regularity with gaps falling within ranges of 0.5 to 0.9 times and 1.6 to 2.0 times wavelengths of the resonance modes.

5. The resonator according to claim 4, wherein a positional relationship between each of the particles and the structure is set by forming a new structure which is physically integrated by attachment, modification, or molecularization of each of the particles to the structure.

6. The resonator according to claim 1, wherein a positional relationship between each of the particles and the structure is set by forming a new structure which is physically integrated by attachment, modification, or molecularization of each of the particles to the structure.

7. An optical resonator comprising:
a master resonator configured to resonate an electromagnetic wave;
one structure or a pair of structures adjacent to each other, each of which is arranged at a position that overlaps one of resonance modes of the master resonator, the one structure or the pair of structures being made up of a material having a permittivity with which a figure of merit that indicates a characteristic of the optical resonator is larger than 1, the one structure or the pair of structures having a size which makes scattering that the electromagnetic wave suffers be Rayleigh scattering; and
one or a plurality of particles, each of which is laid out near the structure by a distance smaller than the size of the structure,
wherein the structure has a shape which is not a perfect sphere, and the structure is laid out in a direction in which a direction of a maximum dimension of the structure agrees with directions of electric fields in the resonance modes or directions of electric fields in one or more of degenerate resonance modes.

8. The resonator according to claim 7, wherein a positional relationship between each of the particles and the structure is set by forming a new structure which is physically integrated by attachment, modification, or molecularization of each of the particles to the structure.

9. An optical resonator comprising:
a master resonator configured to resonate an electromagnetic wave;
one structure or a pair of structures adjacent to each other, each of which is arranged at a position that overlaps one of resonance modes of the master resonator, the one structure or the pair of structures being made up of a material having a permittivity with which a figure of merit that indicates a characteristic of the optical resonator is larger than 1, the one structure or the pair of structures having a size which makes scattering that the electromagnetic wave suffers be Rayleigh scattering; and
one or a plurality of particles, each of which is laid out near the structure by a distance smaller than the size of the structure,
wherein one or a plurality of pairs of the structures are scattered in the master resonator and are laid out at a position, at which an enhancement ratio of an electric field intensity becomes larger than 1, of an electric field distribution of the resonance modes, and
each of the particles is laid out so that a direction from the structure to each of the particles agrees with directions of electric fields in the resonance modes or directions of electric fields in one or more of degenerate resonance modes, and a distance between each of the particles and the structure is not more than a half of the size of the structure, the structure being located at a nearest position from each of the particles.

10. The resonator according to claim 9, wherein a positional relationship between each of the particles and the structure is set by forming a new structure which is physically integrated by attachment, modification, or molecularization of each of the particles to the structure.

11. An optical resonator comprising:
a master resonator configured to resonate an electromagnetic wave;
one structure or pairs of structures adjacent to each other, each of which is arranged at a position that overlaps one of resonance modes of the master resonator, the one structure or the pair of structures being made up of a material having a permittivity with which a figure of merit that indicates a characteristic of the optical resonator is larger than 1, the one structure or the pair of structures having a size which makes scattering that the electromagnetic wave suffers be Rayleigh scattering; and
one or a plurality of particles, each of which is laid out near the structure by a distance smaller than the size of the structure,
wherein at least some of the pairs of the structures are laid out so that a distance between some of the pairs of the structures has a regularity with gaps falling within ranges of 0.5 to 0.9 times and 1.6 to 2.0 times wavelengths of the resonance modes.

12. The resonator according to claim 11, wherein a positional relationship between each of the particles and the structure is set by forming a new structure which is physically integrated by attachment, modification, or molecularization of each of the particles to the structure.

* * * * *